US008479258B2

(12) United States Patent
Weik, III et al.

(10) Patent No.: US 8,479,258 B2
(45) Date of Patent: *Jul. 2, 2013

(54) GARAGE MANAGEMENT SYSTEM (76) Inventors: Martin Herman Weik, III, Stanardsville, VA (US); Charles E. Wainwright, Silver Spring, MD (US)

( * ) Notice: Subject to any disclaimer, the term of this patent is extended or adjusted under 35 U.S.C. 154(b) by 136 days.

This patent is subject to a terminal disclaimer.

(21) Appl. No.: 12/930,437

(22) Filed: Jan. 6, 2011

(65) Prior Publication Data

US 2012/0180103 A1 Jul. 12, 2012

(51) Int. Cl.
*G06F 21/00* (2006.01)
(52) U.S. Cl.
USPC ...... 726/1; 726/4; 726/23; 713/182; 709/201; 380/59; 705/28; 455/117
(58) Field of Classification Search
USPC .......................................................... 716/1, 4
See application file for complete search history.

(56) References Cited

U.S. PATENT DOCUMENTS

| | | | | |
|---|---|---|---|---|
| 5,323,151 | A * | 6/1994 | Parsadayan | 340/933 |
| 7,113,090 | B1 * | 9/2006 | Saylor et al. | 340/539.18 |
| 2003/0084328 | A1 * | 5/2003 | Tarquini et al. | 713/200 |
| 2004/0172283 | A1 * | 9/2004 | Vanderveen et al. | 705/2 |
| 2005/0138111 | A1 * | 6/2005 | Aton et al. | 709/201 |
| 2008/0271109 | A1 * | 10/2008 | Singh et al. | 726/1 |
| 2009/0216876 | A1 * | 8/2009 | Hsieh et al. | 709/224 |
| 2010/0201482 | A1 * | 8/2010 | Robertson et al. | 340/5.61 |
| 2010/0289661 | A1 * | 11/2010 | Styers et al. | 340/686.1 |
| 2010/0328104 | A1 * | 12/2010 | Groft | 340/932.2 |
| 2011/0084840 | A1 * | 4/2011 | Mercier et al. | 340/572.1 |
| 2011/0084855 | A1 * | 4/2011 | Simon | 340/937 |
| 2011/0260851 | A1 * | 10/2011 | Richman | 340/500 |
| 2012/0062395 | A1 * | 3/2012 | Sonnabend et al. | 340/932.2 |

OTHER PUBLICATIONS

Bajic et al., "Auto-ID mobile information system for vehicle life cycle data management", Systems, Man and Cybernetics, 2002 IEEE International Conference on; Date of Conference: Oct. 6-9, 2002, vol. 4.*

* cited by examiner

*Primary Examiner* — Morshed Mehedi
(74) *Attorney, Agent, or Firm* — Michael J. Foycik, Jr.

(57) ABSTRACT

A garage management and monitoring system defines and manages each operational event in a parking facility. Access events, management events, equipment operation events, equipment malfunction events, security events and defined anomaly events are labeled and parsed into a relational database, which is used for generating reports, creating logs, making management decisions, reconstructing accidents, and so on. The equipment includes a computer terminal, a reader, an identifying item or code capable of being read by the reader to control access to the facility, an IP camera, and a garage door or vehicle gate with safety sensors. Each defined event can be codified on the server and/or local controller to create an event library that is downloaded to the controller.
A distributed intelligent system includes: units that gather information about garage, ingresses, and egresses; units that send data to the central server; the central server parses data sent from units and inserts it into a database; the central server formats data and presents it to users; units use unique keys to relate information from several actions the unit has taken to accomplish a task.

12 Claims, 8 Drawing Sheets

MODULE A – TASK TRACKER

MODULE A – TASK TRACKER

FIG. 1

MODULE B - ACCESS MANAGEMENT

FIG. 2

MODULE C - INVENTORY TRACKING/INTEGRATED LET-OUT/
AUTHORIZED ACCESS-EGRESS COUNTS

FIG. 3

MODULE C - INVENTORY TRACKING/INTEGRATED LET-OUT/
AUTHORIZED ACCESS-EGRESS COUNTS

FIG. 3A

MODULE D - THRESHOLD EXCEEDED ALERTS SENT TO MANAGEMENT

GARAGE MANAGEMENT SYSTEM

CROSS REFERENCE TO RELATED APPLICATIONS

This application claims the priority of U.S. patent application Ser. No. 11/228,395 by inventor Martin Herman Weik, III, entitled "Intruder, theft and vandalism deterrent management system for controlling a parking area," now pending, and which in turn is a Continuation of Applicant's prior U.S. application Ser. No. 10/303,025, filed on Nov. 25, 2002 and now U.S. Pat. No. 6,945,303, which is a continuation-in-part of Applicant's prior U.S. patent application Ser. No. 10/131, 029, filed Apr. 25, 2002 now U.S. Pat. No. 7,146,345, and which is a continuation-in-part of U.S. patent application Ser. No. 09/644,901, filed on Aug. 24, 2000, now U.S. Pat. No. 6,484,784 issued on Nov. 26, 2002. This application also claims the priority of U.S. patent application Ser. No. 11/384, 411 by inventor Martin Herman Weik, III, entitled "Parking barrier with accident event logging and self-diagnostic control system," now U.S. Pat. No. 7,509,991. The contents of each of the above-identified parent applications are hereby expressly incorporated herein by reference.

STATEMENT REGARDING FEDERALLY SPONSORED RESEARCH OR DEVELOPMENT

Not applicable.

FIELD OF THE INVENTION

This invention relates to a management system for a garage facility, and more particularly to a system of management which creates and then identifies, catalogues, archives, and retrieves each pre-identified functional event that occurs in the operation of a facility for review and report generation, and for assistance in day to day operations.

BACKGROUND OF THE INVENTION

Several types of parking facilities exist with controlled access. For example, one type of parking facility involves having access controlled by a card actuated automatic gate; another type involves having a posted guard or attendant monitor entering and exiting vehicles. A given facility may issue daily tickets, accept monthly passes, or use other criteria for payment of parking fees.

A number of parking and ticketing systems exist in the marketplace, such as those sold under the names Amano, Skidata, IntgaPark, Federal APD, and the like. Each of these systems is designed to account for vehicles, tickets and revenue and allow or deny access or egress.

However, a common shortcoming in the prior art involves an inability to integrate a remote after hours let-out system with a let-out tracking system that reconciles the overnight activity with the opening and closing inventory records. This is just as important in both manual and automated facilities. In many cases, parking facilities are not manned around the clock. There then exists "overnight activity" that represents vehicles that were processed into the facility and were not processed out before the facility closed for the day. That overnight activity affects the overall daily inventory counts. This overnight activity creates a window of opportunity for attendants to falsify ticket count records and pocket the differences in cash. This can affect the net profit bottom line by hundreds of dollars daily.

In addition, parking patrons that are not monthly or access card authorized can still exit the facilities after closing by piggybacking other accountholders out, that is, by simply following them closely as they exit through a gate, or door thereby avoiding payment and adding to the confusion in ticket count reconciliation. To compound this problem, oftentimes parking patrons may be trapped in a facility after hours and demand that someone come to let them out. After waiting for an hour or more for a let-out attendant to arrive, few patrons are happy to pay an extra fee. Angry words and high emotions are commonplace in such instances.

There exists then a need for a centralized let-out system that can be operated remotely from a closed facility, i.e. after normal operating hours, that can: remotely operate the access/ egress barriers; record the access/egress event by type; accept credit card ("CC") payments on site with a self pay system or alternatively permit a let-out person take the CC information which is then tracked as an event into the system; video capture the event; allow a view of the event as it occurs; and enter the access/egress event into the opening and closing inventory records so as to close the hole in the inventory accounting records. While the foregoing refers to a credit card payment system, it will be understood that self-pay machines may also accept cash payments, and such cash payments are likewise tracked as an event into the system. Other payments methods can be employed, and the foregoing listing is exemplary.

SUMMARY OF THE INVENTION

From the foregoing, it is seen that it is a problem in the art to provide a system meeting the above requirements. According to the present invention, a device is provided which meets the aforementioned requirements and needs in the prior art. Specifically, the device according to the present invention provides a system for operating a parking facility that incorporates a door/gate/vehicle barrier operator control system and its sensors into a sensor network that can track the comings and goings of vehicles after the facility closes, and perform other functions as discussed further hereunder.

The foregoing needs in the prior art are met by the present invention. A parking garage management system is disclosed which integrates and manages the multiple functions of garage management to include revenue and access control, security, employee task management, equipment operation, overnight inventory tracking, remote let-in/out and credit card access and payment into a single database for both individual facilities or groups of facilities.

A facility many have a single entrance/exit or a combination of multiple entrances and exits with controlled access via vehicle gates, crash barriers, doors, gates or a combination of equipment such as doors and crash barriers or doors and vehicle gates. The facility may even have an honor parking system or just meters. The principal requirement for this system to function is the need to track specified recurring identifiable events and the equipment to sense that such a specified identifiable event has occurred and the capacity to identify, log, send, receive, track, store and allow user access to the event data on a server or user accessible storage system.

For descriptive purposes the interrelated system described herein is broken down into modules for clarification purposes. This does not imply that these parts necessarily exist as separate modular elements or pieces of a whole; some or all of the modular elements may exist separately or as integral portions of the larger system. The present invention is not limited to the specific embodiments of individual elements of the system or to the specific conceptual organization of the system into modular elements.

A primary focus of the present invention is a system that incorporates a door/gate/vehicle barrier operator control system and its sensors into a sensor network that can track the comings and goings of vehicles ("vehicle activity") after the facility closes, and integrate that data along with other specified data into a server based database system.

Such other specified data includes a let-out log from a remote let-out office, authorized access card holder activity, and an opening and closing inventory record, all of which are integrated together with the vehicle activity, into the server based database system wherein parking facility managers can "night operate" (perform let-outs and view portal exits/entrances on IP camera feeds) multiple facilities from a single location, view and access the inventory and ticket records and reports, view activity in real time, and generate exception records for detailed review.

The system according to the present invention can capture the data necessary to verify the attendant generated inventory records, thereby closing the "hole" in current tracking systems.

The present invention is directed to a garage management and monitoring system that defines and manages each operational event in a parking facility. The event can be defined by a signal from a single device, a combination of signals from plural devices including signal sequences, signal duration from a device(s) beyond a predetermined threshold, or an event determined by the action of the system such as pictures sent or generated event ID tag. Access events, management events, equipment operation events, equipment malfunction events, security events and defined anomaly events are labeled and parsed into a relational database. This relational database is used for generating reports, creating logs, making management decisions, reconstructing accidents, and so on. In the preferred construction of this invention, the signal generators and program actions are classified as sub-events and events that arise from a combination of sub-events are called "events". For instance: A vehicle entering a facility might generate 30 or more signals from the reader, loops, safety eyes, limit switches etc. and a picture log but be labeled in the data base event log as an "access event".

The equipment used includes a signal-gathering PLC such as SmartDoor System's SDS-0400, or an equivalent PC with an I/O platform to gather device signals, a touch screen or other user interface, a magnetic stripe card reader, an RFID tag, a transmitter or other unique identifier readable device assigned to a customer, employee or contractor, an IP camera and a garage door or vehicle gate with their usual associated operational sensors such as A-B loops, exit loops, safety edges, safety loops, safety eyes, card readers, motor control relays, push buttons, key switches, limit switches and overloads. A local area network can be provided, and connections can be provided to an external network such as the World Wide Web. The connections can be hard wired using land lines, or can be wireless.

All the customary equipment mentioned hereinabove, together with the PLC program, and PLC memory and database and server that is connected to the internet with specialized server software constitutes a facility management system. An access portal on the server allows defined users access to view, edit and operate the system. Each defined event can be codified on the server and/or local controller to create an event library that is downloaded to the controller. Each event in the event library is defined and numbered so that as the controller processes its input signals and determines that an event has occurred it can transmit the event code to the server for sorting and archiving along with the picture file received from the IP camera and the signal signature from the inputs from the sensory network. Alternately, the server can collect signal event data and process the data into the database or a combination can occur where the PLC and the server can generate named events from the data record. The user can then access the server and view the events, event data, picture log, generate reports, control equipment remotely, and send alerts to identified users. The event and/or sub-event can also be libraried as a plain text message.

The server thus becomes a portal to setup, view, store, sort and manage the system generated data from various locations where management can then access and use the information to make real time decisions on operations, staffing, billing, cost accounting, in the day to day operation of the facility. The system should send "auto alerts" (i.e., automatically generated alert messages) when certain preset thresholds are met. These thresholds should be user set on any tracked event, and alerts are sent to operating personnel, management, or senior management as determined by the operating software. Satisfaction of the alerted function can also be a trackable event. For example, such events can include: Did the restroom get cleaned on schedule? Did the manager reconcile the tickets and cash drawer in its schedule? Did the sweeper do his sweeping, pressure washing, etc.?

Included in the system of the present invention is a revenue equipment monitoring system where an SDS-0400 type panel (a PLC with numerous I/O's, I/O's meaning Inputs/Outputs) is a signal collector and processor for all the typical and customary revenue equipment which typically includes the ticket spitters, traffic gates, and access (card, RFID) systems, cash drawer switch, and gate UP/DOWN switch. The typical system includes loop detectors for the traffic gate known usually as the A-B loops or the arming and reset loops which generate a signal in the presence of a vehicle. The lanes associated with the vehicle gate can be designated in the PLC as IN or OUT or switched (e.g. usually "IN" in the morning and "OUT" in the afternoon to accept the peak traffic flows). The signal sequence of the system including the A-B loop detectors, the ticket "vends", the reader "reads", and the IN and OUT lane counts are all monitored by the PLC and the signals are processed for anomalies, thresholds are set, alerts are set, and so on. Each access or egress is an event, and all signal data and pictures are sent to the server. The vehicle counts are inserted into the inventory records for reconciliation with the tickets and overnight traffic. Anomalies such as "gate up beyond set time" or "loop signals active beyond set time" indicate equipment tampering or failure. The picture record of the anomaly can be viewed by a remote manager in real time to determine a course of action, alert managers, activate maintenance personnel or even close off lanes.

The present invention can be viewed as a distributed intelligent system that includes: units that gather information about garage, ingresses, and egresses; units that send data to the central server; the central server parses data sent from units and inserts it into a database; the central server formats data and presents it to users; units use unique keys to relate information from several actions the unit has taken to accomplish a task.

Other objects and advantages of the present invention will be more readily apparent from the following detailed description when read in conjunction with the accompanying drawings.

DETAILED DESCRIPTION OF THE INVENTION

A parking garage management system (where "garage" is defined as any parking facility whether a structure or a surface parking lot) is disclosed which integrates and manages the multiple functions of garage management to include access control, security, employee tracking and task management, equipment operation, revenue control, overnight inventory tracking, remote let-in/out and credit card access and payment into a single database for both individual facilities or groups of facilities. The security function may include gamma ray detectors, nitrate sniffers, license plate identification readers, under vehicle scanners and the more typical cameras.

A facility many have a single entrance/exit or a combination of multiple entrances and exits with controlled access via vehicle gates, crash barriers, doors, gates or a combination of equipment such as doors and crash barriers or doors and vehicle gates. The facility may even have an honor parking system or just meters. The principle requirement for this system to function is the need to track specified recurring identifiable events and the equipment to sense that such a specified identifiable event has occurred and the capacity to send auto alerts, identify, log, send, receive, track, store and allow user access to the event data on a server or user accessible storage system.

For descriptive purposes the interrelated system described herein is broken down into modules for clarification purposes. The present invention is not limited to the specific embodiments of individual elements of the system or to the specific conceptual organization of the system into modular elements, but can be varied within the ambit of skill of one having skill in the art.

Figure 1:
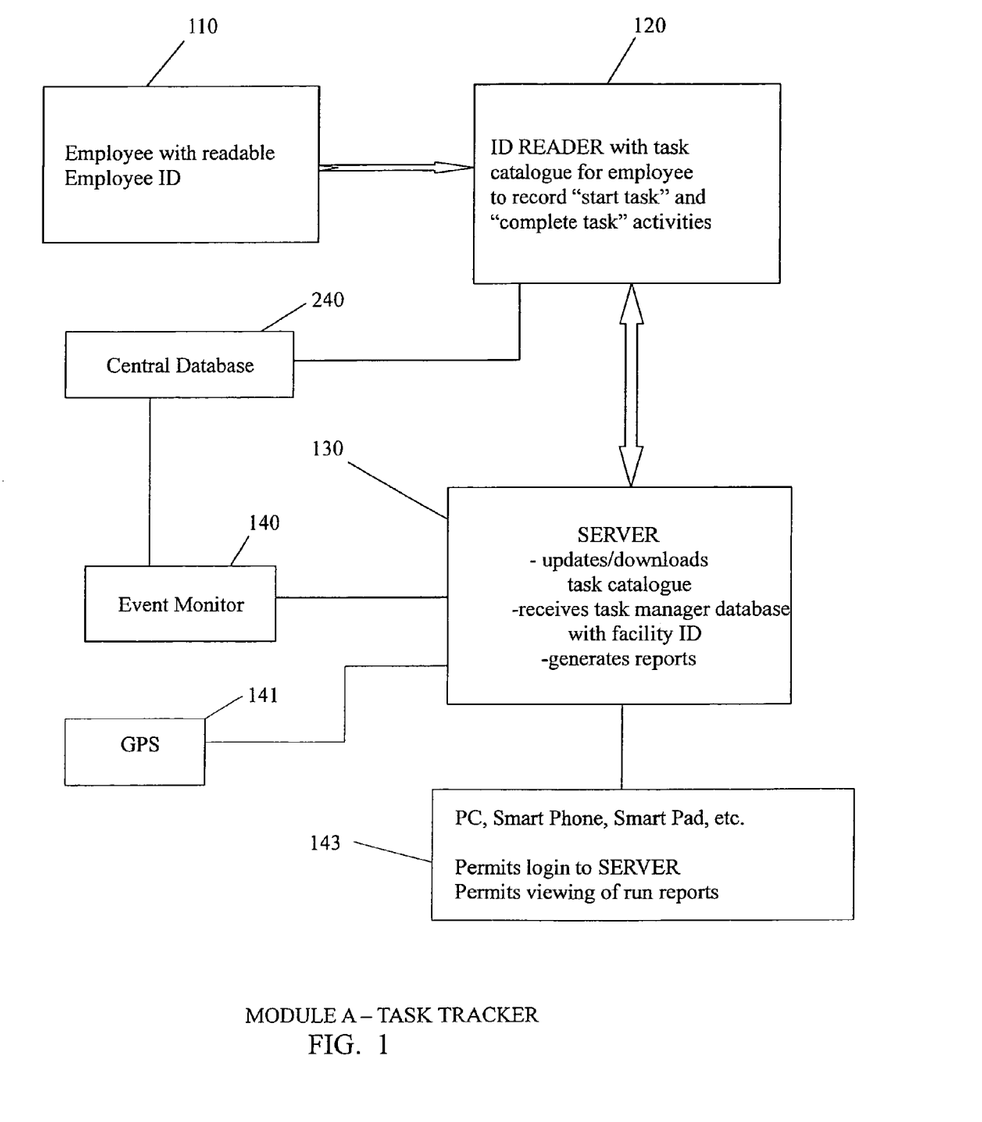
FIG. 1 is a schematic illustration of a task tracker module, also referred to hereunder as Module A, according to the present invention.

FIG. 1 is a schematic illustration of a task tracker module A. In this illustration, at block 110 an employee with a readable employee ID presents that ID to an ID reader shown at block 120. The ID reader 120 has a task catalogue for the employee to record a "start task" event and to record a "complete task" event. Thus, when starting a project, such as cleaning a restroom, the employee would enter his/her ID badge into the ID reader 120 and select the task from a menu, then select "start task"; when the task is completed the employee would repeat the above steps and select "complete task" from the menu. In a preferred embodiment, the employee swipes in the ID badge upon arrival in the manner noted above; picks a task or tasks from a drop-down task menu which appears on a screen, and then swipes their ID badge OUT when leaving the facility.

A central database 240 is connected for communication with the ID reader 120. The database 240 contains, among other things, the listing of employees who are permitted to work in an area, so as to prevent unauthorized access by unapproved individuals. In a preferred embodiment, the central database 240 provides updates to the ID reader 120 so that in event of disruption of communication, the ID reader 120 can still perform independently.

A server 130 is connected for two-way communication with the ID reader 120. The server 130 updates and downloads the task catalogue to the ID reader 120. The server 130 also receives the task manager database with the facility ID; where more than one facility is being managed, the facility ID enables the system to recognize the location at which the event is occurring. Here, the event in question is the employee's selection of the "task start" or "complete task" menu item. In another preferred embodiment, the user can have the option of selecting more than one task, for example "deliver paychecks" and "investigate an accident".

An event monitor 140 is connected for communication with the server 130, and tracks the occurrence of the event and is connected for communication with the central database 240 to record the information surrounding the event. Here, the information would include the employee's ID, the specific task, when the task is started or completed, the location of the ID reader 120, and the facility ID. Other information would be provided by any sensors in the vicinity which are triggered by the event such as cameras, or which operate continuously such as motion sensors, video cameras, thermal sensors, and/or other sensor types. The authorized users can then log on to the server 130 using any device that allows Internet access. A GPS tracker 141 (discussed further hereunder) is integrated into the server database 240 so that daily task reports can include travel times and routes between facilities, and other information that the GPS tracking systems offer.

FIG. 1 thus shows a task tracking means for tracking employee's and tasks including start time and completion time, and provides event ID information and location ID information to the central database 240.

FIG. 1 also depicts a feature of GPS 141, which includes GPS tracking of employees and other personnel by their cell phones. The GPS feature can optionally track persons using any GPS device such as a Garmin or any number of GPS devices available in the art.

In FIG. 1, the Server 130 also generates reports, and communicates with a device 143 such as a PC, a smart phone such as a Blackberry® or Android®, a smart pad such as an Ipad® or Nook®, etc. This communication permits a user such as a manager to login to the system, view and run reports, receive alerts, and track employees via the GPS 141.

Figure 2:
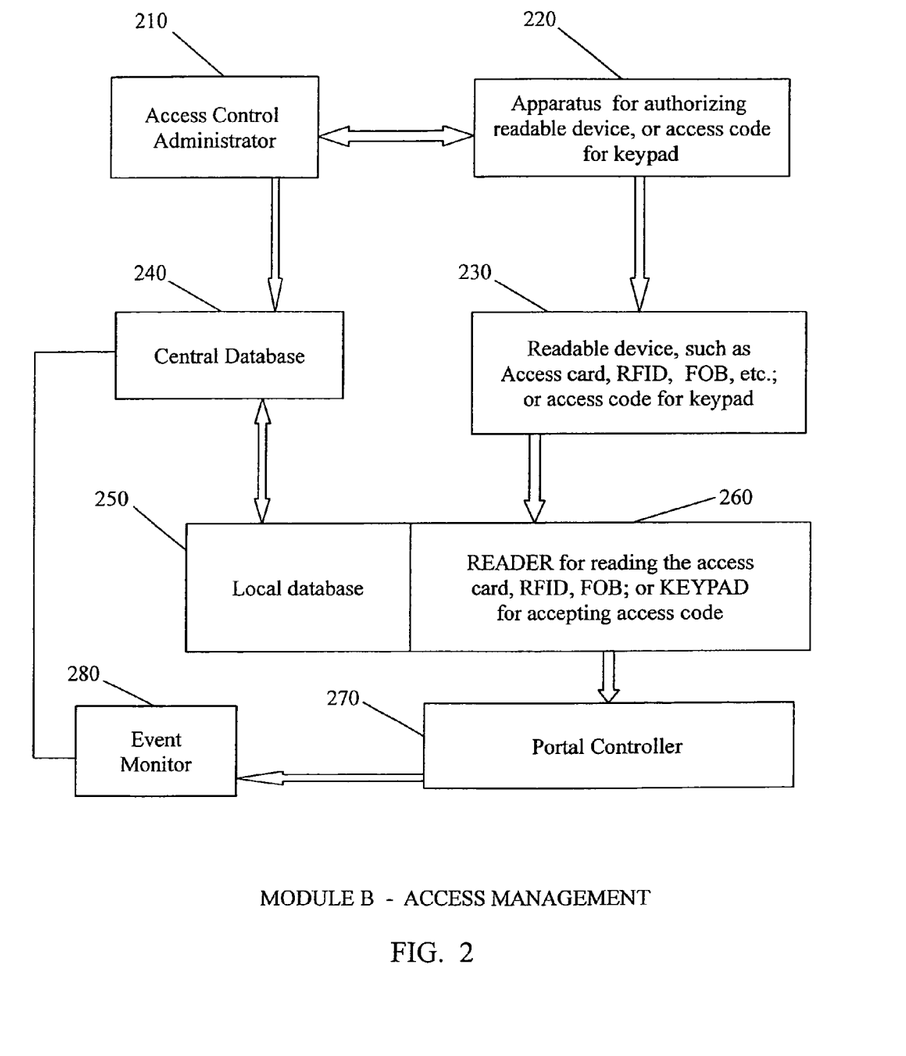
FIG. 2 is a schematic illustration of an access management module, also referred to hereunder as Module B, according to the present invention.

FIG. 2 is a schematic illustration of an access management module, also referred to hereunder as Module B defining an access management means, which includes an access control administrator 210 which communicates with an apparatus 220 for authorizing a readable device 230. The readable device 230 can be, for example, a printed ticket or magnetic card, RFID, FOB, and Transmitter with code. In the event that a person wished to gain entry/exit and they do not have an authorized device such as an access card, they can call the let-out manager who can access the let-in/let-out module on the server for the facility and portal where the person desires access. The server generates a let-out screen where information concerning the access event can be entered into the database. The form may include the person's name, license plate number, reason for gaining access/egress, or any other information considered important to the event. If the manager determines that the customer meets the criteria for access/egress, he can validate the event and remotely open the portal through the connection of the server to the portal PLC indicated at 370 in FIG. 3. In the event the communication link is down, the server can generate through an algorithm a code that is matched by the algorithm generated in the PLC 370 program and after entry of the code on the customer interface if the codes match the portal can be opened. The server tracks the event and all the event information; the camera can record the license plate, picture of the vehicle, etc. The access code, when issued, is usually temporary or a one time use code, and is used by manual entry into a keypad. In either case, the apparatus 220 provides a way for the user to gain entry/exit into one or more sections of the facility, either by use of the readable device 230 or by use of the access code and the event information is logged into the system.

The access control administrator 210 communicates with the central database 240. The readable device 230 is used with a reader 260. The reader 260 is used for reading the readable device 230 such as an access card, RFID, FOB, etc., or the reader can be a keypad for accepting the access code issued by the apparatus 220.

Connected to the reader 260 is a local database 250 which communicates with the central database 240. The local database 250 contains data allowing determination of validity of the readable device 230 or access code, so that in case the local database 250 cannot communicate with the central database 240, the reader 260 still continues to work correctly to allow or deny entry. The local database 250 is updated regularly by the central database 240 so that the information is current.

The reader 260, when granting access, activates a portal controller 270 which activates a portal barrier, such as a gate or door, to permit entry. An event monitor 280 records the associated data, pictures, codes, etc., similarly to that for the event monitor 140 described hereinabove. The event monitor 280 communicates with the central database 240.

Figure 3:
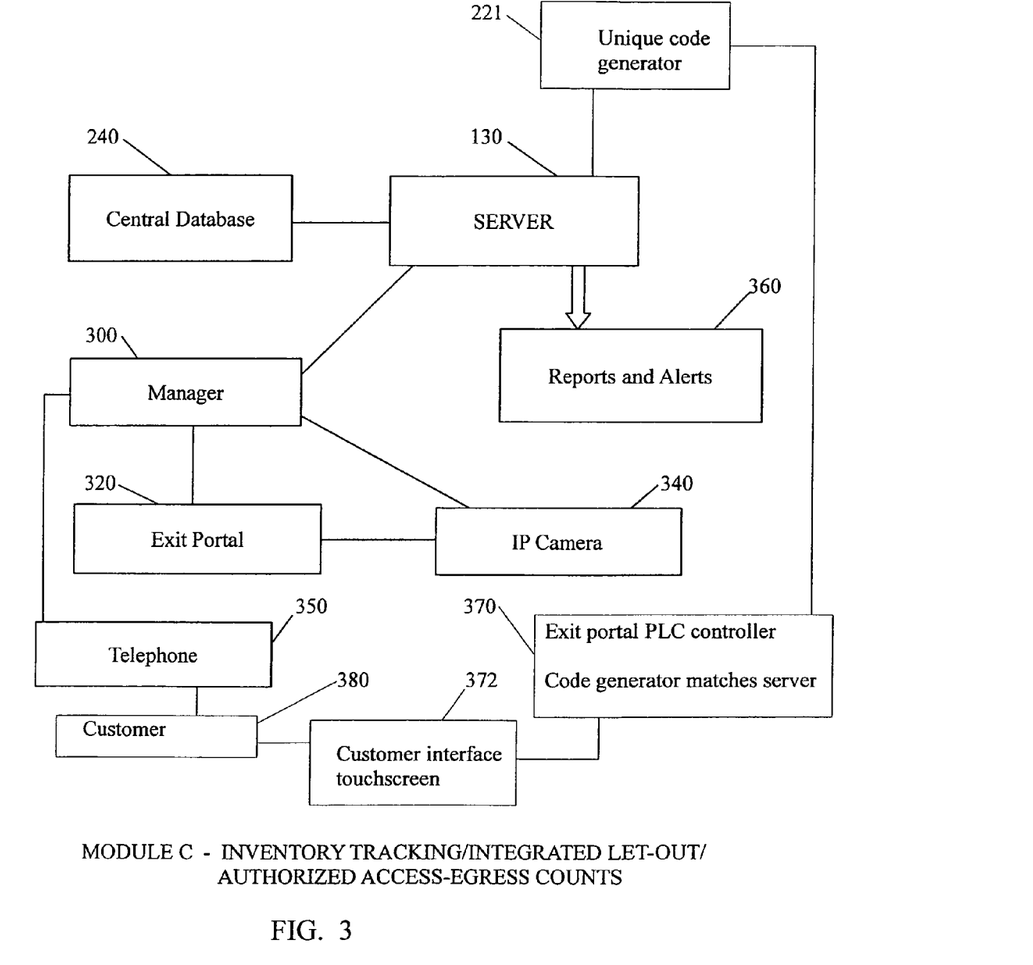
FIG. 3 is a schematic illustration of an inventory tracking module, also referred to hereunder as Module C, according to the present invention.

FIG. 3 is a schematic illustration of an inventory tracking module, also referred to hereunder as Module C defining an inventory tracking means, which performs inventory tracking, integrated let-out, and performs authorized access-egress counts. The Module C includes the server 130 which communicates with the central database 240 and also communicates with a manager 300 which is a human (a live person).

As seen in FIG. 3, the manager 300 is in communication with the server 130 and with a telephone 350. The IP camera 340 is positioned so as to provide a view of an exit portal where a customer wishes to exit/enter. The manager 300 receives video information via the server 130 from the IP camera 340 at the location of the exit portal where the customer is located, and the manager 300 can view the pictures from the camera 340 when making a decision about opening or closing that exit portal. The video from the IP camera 340 is also stored in the central database 240 and tagged with identifying information relating that video to the other sensory data and informational data stored in the central database 240 so that a complete record can be retrieved and analyzed by software at the server 130 to generate reports and alerts 360, and can also be viewed later together with the other event data by management performing checking or review. The server 130 uses the event information in conjunction with its programming to produce the reports and alerts 360.

As seen in FIG. 3, a unique code generator 221 is connected to the server 130 and to the Exit Portal PLC controller 370 wherein the code generator matches the server 130, for the purposes already discussed hereinabove. The Exit Portal PLC controller 370 is connected to the IP camera 340 and to a customer interface touch screen 372. A customer 380 can communicate using the telephone 350 and by using the touch screen 372, for the purposes discussed hereinabove.

Figure 3A:
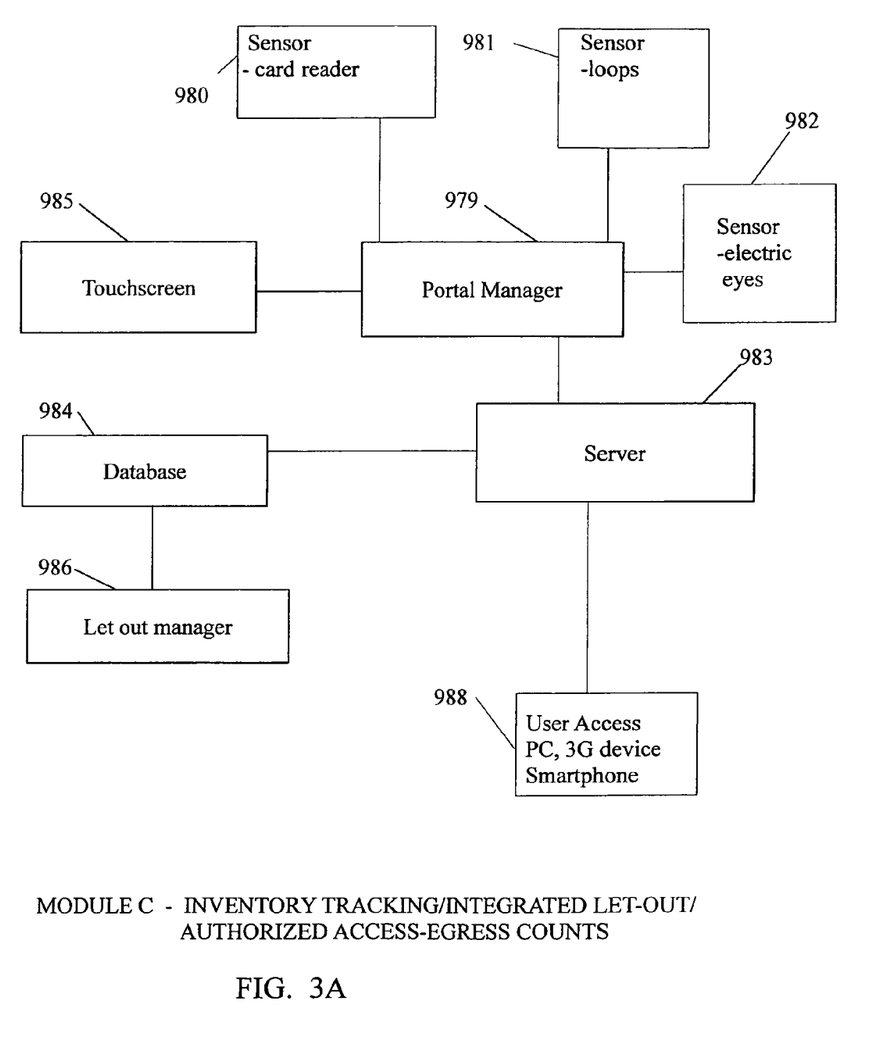
FIG. 3A is a schematic illustration of an inventory tracking module, also referred to with regard to FIG. 3 as Module C defining an inventory tracking means, which performs inventory tracking, integrated let-out.

FIG. 3A is a schematic illustration of an inventory tracking module, also referred to with regard to FIG. 3 as Module C defining an inventory tracking means, which performs inventory tracking, integrated let-out. In this view, the Module C includes the elements 979-986 and 988, which have elements as described above. Here, the server is designated 983, and the operation of the system is described below. The server 983 communicates with the central database 984 and also communicates between the portal controller 979 and the customer interface (touch screen) 985. The attendant enters the opening and closing inventory counts on the customer interface and the ticket types which are customary in the parking business. The portal manager through its sensor network of loops 981, eyes 982, readers 980, etc., counts the vehicles in and out that are authorized through the access control manager. It also counts tailgators distinguished by the signal type and sequence. This information is communicated to the server and merged with the let-out log data. Each access egress event includes the video log and the sensor signal data. If the inventory counts and overnight activity deviate beyond a threshold (user settable) alerts can be sent out and the individual access/egress events can be scrutinized in the event record.

In this way the hole in the inventory record that occurs from the overnight activity or during the period the facility is not open is closed by the system event record.

Figure 4:
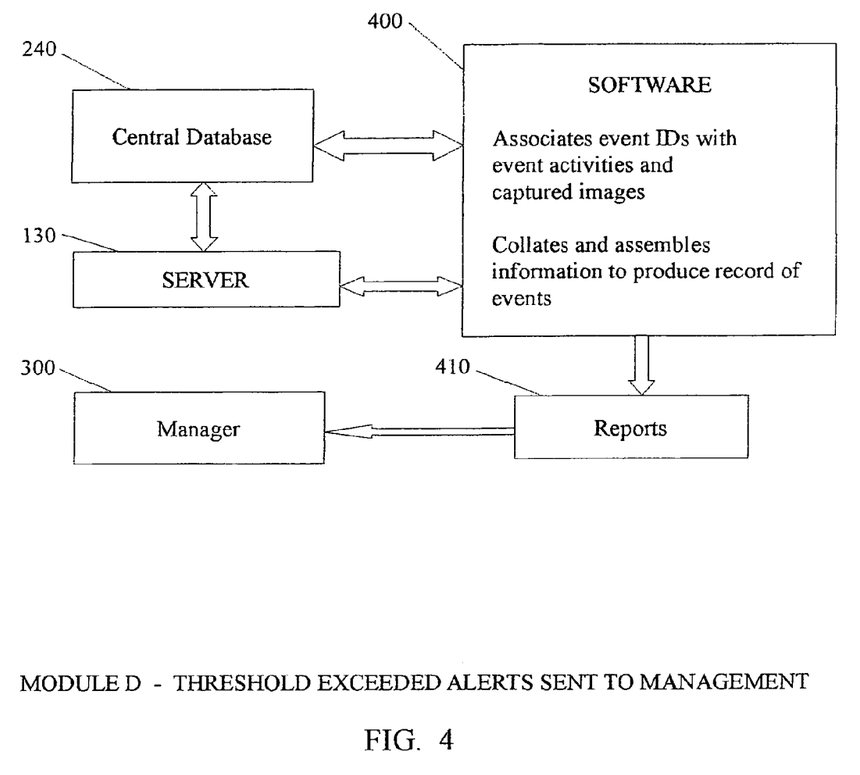
FIG. 4 is a schematic illustration of a module for generating threshold exceed alerts which are sent to management, also referred to hereunder as Module D, according to the present invention.

FIG. 4 is a schematic illustration of a module D for generating threshold exceed alerts 410 (labeled "reports" 410 in this view) which are sent to management. The module D defines an alert means. In this view, the server 130 communicates with the central database 240 and also communicates with specialty software 400, to generate the reports 410. The reports 410 can be "threshold exceed alerts" and/or can include other types of reports such as maintenance logs, duty logs, accident logs, and so on.

The specialty software 400 associates event IDs with event activities and captured images. The specialty software 400 also collates and assembles information to produce a record of events.

More specifically, every piece of information in the central database 240 has associated with it identifying information relating it to specified, predetermined types of events which can be recognized by the specialty software 400. This allows all relevant information to be quickly pulled together and analyzed by the specialty software 400 and/or reviewed by a human manager.

The "threshold exceed alerts" can be summarized in a report and reviewed when a manager arrives in the morning, for example. The events giving rise to the "threshold exceed alerts" can then be reviewed in detail by the manager with all event information and pictures/video readily available at a computer monitor.

With regard to the communications between elements of the modules A, B, C, and D discussed hereinabove, it will be understood that these communications can be by cable, wire, radio, intranet, internet, satellite, infrared, or any other type of communication technology known to anyone having skill in the electronic communication arts. Specifically, it is expressly intended that control signals can be provided by internet connections using the world wide web, or any other well known type of internet connection. It is also specifically intended that mobile smart cell phone technology, which includes email enabled and internet enabled wireless cell phones, can be used for the communications. It is especially contemplated that such smart cell phones be provided for those control functions reserved to the management, so that managers can operate from their mobile smart cell phones while away from their offices.

Figure 5:
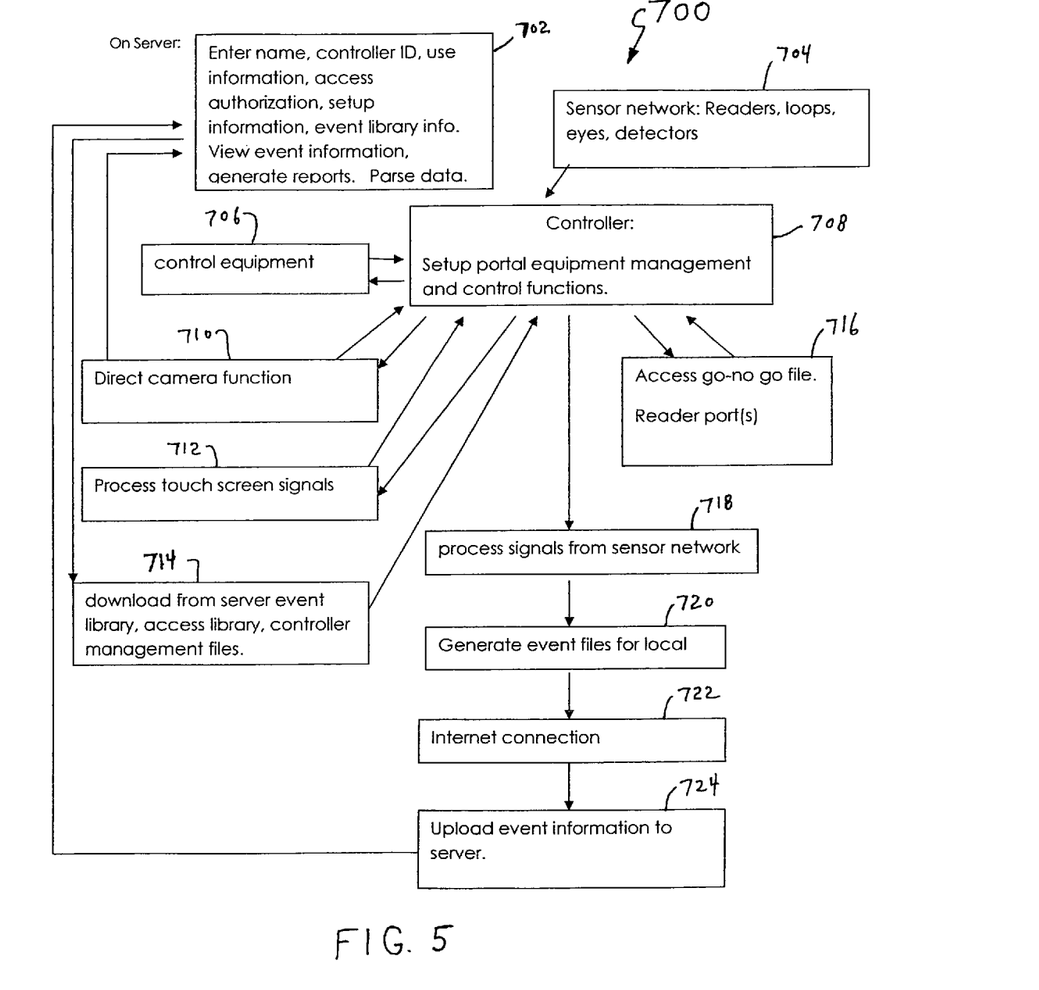
FIG. 5 is a schematic diagram of the operation of the system according to the present invention, indicating interactions between a controller, sensors, input devices, and software.

FIG. 5 is a schematic diagram of the operation of the management system 700 according to the present invention, indicating interactions between a controller, sensors, input devices, and software. It will be understood that many types of such controllers, sensors, input devices, and software are available and are individually used in facility management, and that the present invention is not limited to any one type of such controllers, sensors, input devices, and software. However, the management functions of the present invention require specialty software which functions in the manner described hereinabove and as further discussed hereunder, so that the management software of the present invention can be made with reference to this disclosure by anyone having skill in the software arts relating to the present invention.

As shown in FIG. 5, on the server as shown at server 702 a manager enters their name, controller ID, use information, access authorization, setup information, and event library information. The manager can view event information, generate reports, and parse data. The server 702 receives inputs from a direct camera function 710 and event information generated by a controller 708, and outputs at 714 a download from the server event library, access library, and controller management files.

The controller 708 receives inputs from a sensor network 704 which includes any or all of: readers, loops, eyes, and detectors, as well as any other desired sensor information. The controller 708 also communicates with control equipment 706, the direct camera function 710, process touch screen signals 712, and the download 714 discussed above. The controller 708 also communicates with an access go-no go file 716 which relates to reader ports.

The controller 708 then processes signals as shown at block 718, the signals being those from the sensor network. The processed signals from 718 are then used at block 720 to generate event files for local information. These event files are transmitted along an internet connection 722 to upload information to the server as shown at block 724.

Figure 6:
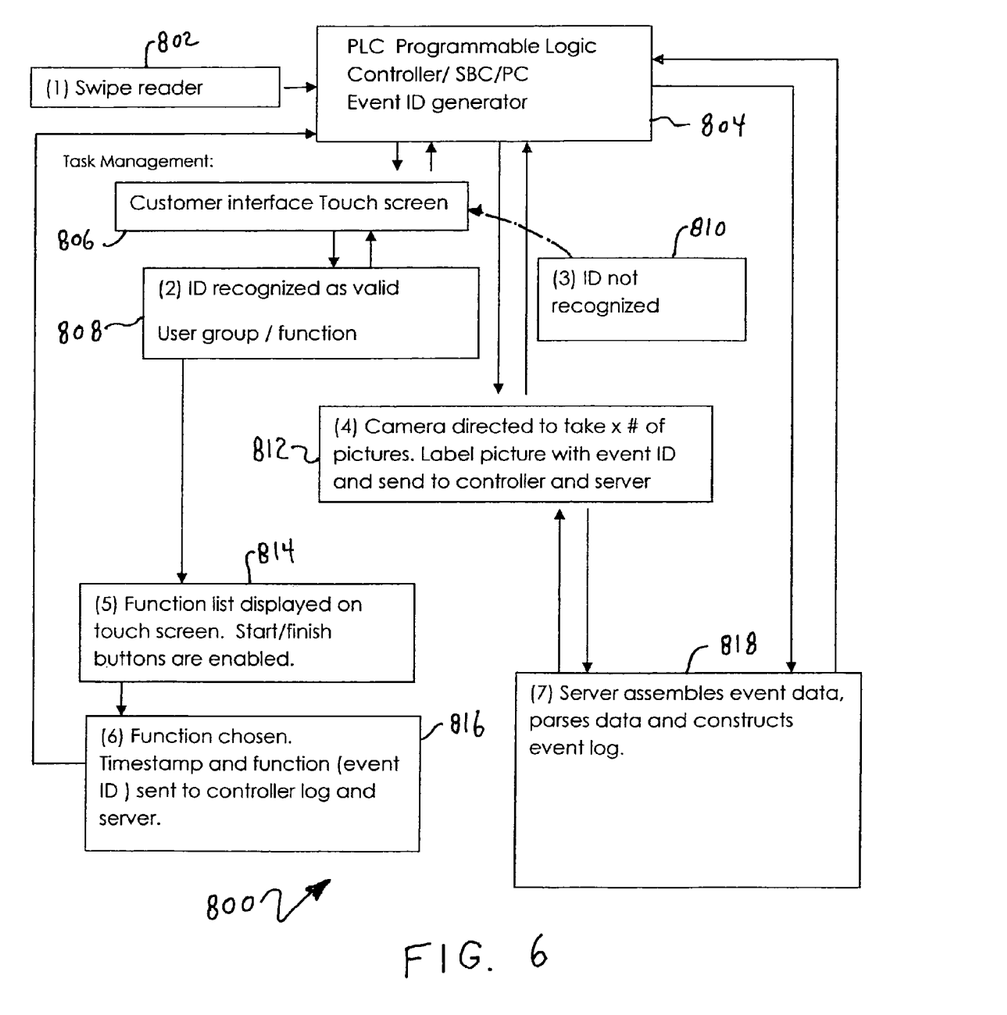
FIG. 6 is a schematic flowchart of a sequence of events during use of the system according to the present invention, indicating interactions whereby a server assembles event data, parses the data, and constructs an event log.

FIG. 6 is a schematic flowchart 800 of a sequence of events during use of the system according to the present invention, indicating interactions whereby a server assembles event data, parses the data, and constructs an event log. This is discussed further hereunder.

At block 802, a first step (1) is shown using a swipe reader to read information. The information is communicated to an event ID generator 804, which is one of a PLC programmable logic controller/SBC/PC that can be programmed for use for event ID generation. The event ID generator 804 communicates with a customer interface touch screen 806 (or equivalent input device such as a keypad, etc.), where at step (2) indicated at block 808 the ID input at block 806 is recognized as valid for a user group/function.

Step (3) is indicated at block 810, wherein the ID is not recognized, thereby denying access to the system by the user. The validity of the ID is confirmed or denied by comparison of the ID with a database stored at the local database (not shown in FIG. 6) which is similar to that shown as local database 250 in FIG. 2.

The event ID generator 804 also communicates with a camera 812 at step (4), indicated at block 812 in FIG. 6, wherein the camera 812 can be directed to take "x" number of pictures (where "x" is a selectable number or a predetermined number of sequential pictures, or take pictures of any amount as directed by its specialty program), label those pictures with an event ID, and send those pictures to the controller 804 and to the server 130.

At block 814, labeled step (5), a function list is displayed on the touch screen display. Start/finish buttons are provided, to let the user indicate the start or finish of a given task. The output goes to block 816, labeled step (6), where a function is chosen, and a timestamp along with the function and its event ID are sent to a controller log of the controller 804 as well as to the server 130.

At block 818, labeled step (7), the server 130 assembles event data, parses that data, and constructs an event log. As shown, the server 130 communicates with the event ID generator 804.

A primary focus of the present invention is a system that incorporates a door/gate/vehicle barrier operator control system and its sensors into a sensor network that can track the comings and goings of vehicles ("vehicle activity") both during regular facility operating hours as well as after the facility closes, and integrate that data along with other specified data into a server based database system.

Such other specified data includes a let-out log from a remote let-out office, authorized access card holder activity, and an opening and closing inventory record, all of which are integrated together with the vehicle activity, into the server based database system shown and described hereinabove wherein parking facility managers can "night operate" (perform let-outs and view portal exits/entrances on IP camera feeds) multiple facilities from a single location, view and access the inventory and ticket records and reports, view activity in real time, and generate exception records for detailed review.

The system according to the present invention can capture the data necessary to verify the attendant generated inventory records, thereby closing the "hole" in current tracking systems.

The present invention is directed to a garage management and monitoring system that defines and manages each operational event in a parking facility. Access events, management events, equipment operation events, equipment malfunction events, security events and defined anomaly events are labeled and parsed into the relational database 240. This relational database 240 is used for generating reports, creating logs, making management decisions, reconstructing accidents, and so on.

The equipment used includes a PLC such as the aforementioned SDS-0400 panel 804, or a PC with an I/O platform, and a user interface such as a keypad, keyboard, or touch screen or other user interface, a magnetic stripe card reader, an RFID tag, a transmitter or other device uniquely assigned to a customer, employee or contractor including biometric readers, an IP camera 340 and a garage door or vehicle gate with their associated operational sensors such as safety edges, safety loops, safety eyes, card readers, and motor control relays and limits. A local area network can be provided, and connections can be provided to an external network such as the World Wide Web. The connections can be hard wired using land lines, or can be wireless.

All the equipment mentioned hereinabove, together with the database and server, constitutes a facility management system that is connected to an internet server with specialized server software. An access portal on the server allows defined users access to view, edit and operate the system. Each defined event can be codified on the server and/or local controller to create an event library that is downloaded to the controller. Each event in the event library is defined and numbered so that as the controller processes its input signals and determines that an event has occurred it can transmit the event code to the server for sorting and archiving along with the picture file received from the IP camera and the signal signature from the inputs from the sensory network. The user can then access the server and view the events, event data, picture log, generate reports, control equipment remotely, and send alerts to identified users.

The server thus becomes a portal to setup, view, store, sort and manage the system generated data from various locations where management can then access and use the information to make real time decisions on operations, staffing, billing, cost accounting, in the day to day operation of the facility.

Figure 7:
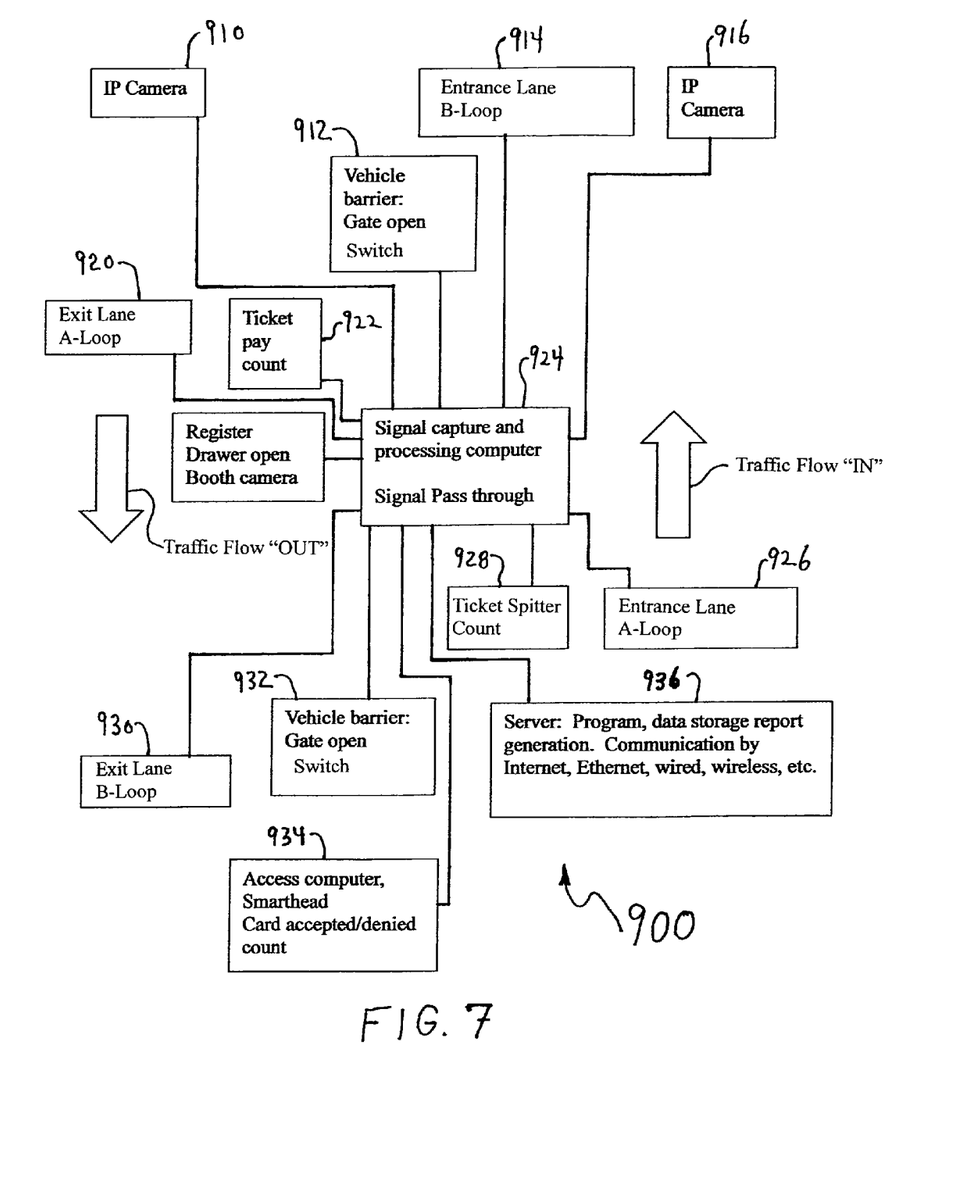
FIG. 7 is a schematic diagram of a revenue control module, showing interactions between vehicle detectors, ticketing and revenue collection, and a controller.

FIG. 7 is a schematic diagram of a revenue control module 900, showing interactions between vehicle detectors, ticketing and revenue collection, and a controller, as described further hereunder.

The revenue control module 900 included in the system of the present invention is a revenue equipment monitoring system where an SDS-0400 panel or its equivalent with multiple I/O's and logic is a signal collector and processor for all the revenue equipment which includes the ticket spitters, traffic gates, and access (card) systems, cash drawer switch, and gate UP/DOWN switch. Such revenue equipment, by itself, is well known in the prior art and accordingly is not shown herein. The loop detectors for the traffic gate known usually as the A-B loops or the arming and reset loops generate a signal in the presence of a vehicle. The lanes associated with the vehicle gate can be designated as IN or OUT or switched (e.g. usually "IN" in the morning and "OUT" in the afternoon to accept the peak traffic flows). The signal sequence of the A-B loop detectors, the ticket "vends", the reader "reads", and the IN and OUT lane counts and any other generated signals are all monitored and the signals processed for anomalies, thresholds are set, alerts are set, and so on. Each access or egress is an event, and all signal data (called sub-events here) and pictures are sent to the server. The vehicle counts are inserted into the inventory records for reconciliation with the tickets and overnight traffic. Anomalies such as "gate up beyond set time" or "loop signals beyond set time" or signals not in the usual sequence indicate equipment tampering or failure. The picture record of the anomaly can be viewed by a remote manager in real time to determine a course of action.

As seen in FIG. 7, the various devices (described further hereunder) report to a signal capture SDS-0400 I/O PLC 924 or its equivalent, which is identified in FIG. 7 as element 924 which is a "signal capture and processing computer" with "signal pass through" or parallel signal capture. The abbreviation PLC is used for "programmable logic controller," as a standard abbreviation in this art. The signal being passed through is the input of the I/O platform 924. The parallel signal device is a multi-pole switch that can provide two or more circuits with the same signal.

FIG. 7 shows an IP camera 910 and an IP camera 916, where the abbreviation IP refers to internet protocol camera, which includes web cams and the like. The IP cameras 910 and 916 provides output signals to the previously described PLC 924. An Entrance 914 for the B-loop is shown, as well as a vehicle barrier 912 capable of indicating "gate open" when the B-loop is active. The entrance 914 and the barrier 912 both send output signals to the PLC 924.

An exit lane with typical parking equipment is described with an A-loop 920 and B-loop 930, a ticket pay count 922, a register 938 indicating drawer OPEN and an exit vehicle barrier 932, all provide output signals to the PLC 924. Also shown is a typical entrance lane, and providing output signals to the PLC are: a ticket spitter with ticket count 928, an entrance lane A loop and entrance B loop 930, an entrance lane vehicle barrier 912 with a gate OPEN output when the gate is up, an access computer 934 as is common in the industry or the access system herein described which provides a card accepted count or signal to be counted.

The PLC 924 communicates with a server 936. The server 936 includes the program(s), provides data storage and generates reports, and communicates by Internet, Ethernet, wired, or wireless, or by any other form of communication used in the signal communication arts. A large arrow 940 indicates the vehicle direction "out" or egress, and a large arrow 950 indicates the "in" or ingress direction.

IP cameras 916 and 910 and or other cameras are directed to take pictures by the PLC 924 based on the signals captured and its program. The PLC 924 program can direct the camera to tilt, pan and shoot to capture anomalies or as directed by the offsite operator.

Here, the I/O PLC 924 logs and timestamps all signals. The PLC 924 also activates corresponding Outputs to mirror the input signals or captures the parallel signals described earlier.

The parking equipment described heretofore although typical does not detail all the possible configurations found in the art. More than one "in" and one "out" lanes are common. Some lanes are reversible as already mentioned. Some configurations include additional barriers such as doors, pop-up hydraulic barriers and plates and/or tiger teeth and under vehicle scanners. This equipment has its common sensor system including but not limited to loops, eyes, limits switches, pressure switches, cameras, etc. Any, most or all this equipment is included in the sensor net that is within the scope of this invention. More equipment means more signals generated and available to be captured into the system for review, report generation, etc. as described earlier.

The IP cameras can send picture data files to PLC 924 which can store them or resend them to the server 936. Or, the IP cameras can send the pictures directly to the server with the system generated ID for reassembly in the event log. The different configurations and data paths that are possible to anyone skilled in the art of data capture and transmission is also included within the scope of this invention.

By mirroring the Input signals and capturing the parallel signals, the system operates in the same design as the current art, but with the following enhancements not found in the current art:

a. Signals can be logged and time stamped for diagnostic review to detect tampering or malfunction. Tampering can indicate theft of revenue. The PLC program 936 analyzes the signal signature of each device in its relation to the totality of the signals and its program. Anomalies to the expected signals are captured, labeled, stored, sent to a central storage unit such as a server for analysis by managers along with the picture record.

b. Signal log can be sent off-site for remote viewing and record keeping.

c. Each access/egress event can be videotaped or picture recorded and remotely viewed.

d. Operations of multiple lanes, or multiple lanes and multiple locations, can be compared and analyzed for anomalies that indicate theft.

The server 936 receives all the designated signal traffic and event data into a database program from which reports can be generated. Some examples follow; these are merely exemplary and in no way limit the types of functions and reports, etc., that could be provided by the present invention. Anyone having skill in the computer programming art could set a program to detect a whole range of anomalies as defined events, beyond those shown hereunder.

EXAMPLES

The cameras can be directed to perform predetermined tasks associated with the generation of a specific defined anomaly. For instance: if the register drawer switch stays active beyond a threshold, the camera can be instructed to pan and tilt to the register and take X number of pictures.

If the A-B, A-B loop sequence is instead A-B, B-A (usually a vehicle back out but was a ticket pulled or not?) is detected, the camera can record the event and the ticket pull or not determined.

If an Exit A and or B loop or Entrance A and or B loop signal duration is beyond a threshold, it could indicate that the gate is being intentionally kept open to foil the "counts" thereby allowing theft.

Each signal can be counted in relation to each other, as follows. Entrance Tickets+card reads should equal A-loop=B-loop=entrance gate up=Exit tickets+exit card reads=Exit A-loop=Exit B-loop=Exit Gate up. Plus or minus (+ or −) daily inventory counts at opening and closing with overnight activity (let-outs, CC pay, card reads) used to verify attendant inventory and ticket logs. The relationships can be determined in the program and exceptions can generate alerts to management.

If an exit gate "gate open" signal is detected and more than one A-loop and B-loop signal is detected it would indicate that the gate is broken in the up position and/or possibly cars are being allowed to exit without registering a payment.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A management system for a facility, comprising:
a computer;
a database in communication with said computer;
a task tracking means in communication with said database;
an access management means in communication with said database, for supplying event information to said database;
an inventory tracking means in communication with said database, for supplying event information to said database; and
an alert means in communication with said database, using said event information;
wherein said inventory tracking means further comprises a camera in communication with said computer, said camera being located to provide images of entry and egress of vehicles at a portal of the facility;
and wherein said alert means further comprises software operated by said computer to associate event IDs with event activities and images captured at the time of the event such that said alerts include data and images captured during a time period immediately surrounding the abnormal event,
whereby said computer uses the event information supplied to said database to compile an event library which can be used to generate alerts, compile reports, and control access to and egress from the facility and uses said alerts to notify management of abnormal events together with data and images surrounding the abnormal events.

2. A management system for a facility as claimed in claim 1, further comprising a network providing communication with said database and with said computer.

3. A management system for a facility as claimed in claim 1, wherein said task tracking means comprises an ID reader for reading employee IDs and for receiving task information from the employee, and an apparatus for generating machine readable IDs for use with said ID reader.

4. A management system for a facility as claimed in claim 3, further comprising an event monitor for recording an event which includes the reading of the employee ID together with the entering of the task information into the ID reader.

5. A management system for a facility as claimed in claim 1, wherein said access management means further comprises a readable device which carries permission information to permit a patron to access the facility, and an apparatus for reading said readable device.

6. A management system for a facility as claimed in claim 5, further comprising a local database in communication with said apparatus for reading, wherein said local database carries information relating to permission to use the facility by a patron using said readable device.

7. A method for managing a facility which has controlled access for vehicles, comprising the steps of:
providing a computer;
providing a database in communication with said computer;
providing a task tracking means in communication with said database;
providing an access management means in communication with said database, for supplying event information to said database;
providing abnormal event information to said database which represents predetermined conditions which do not ordinarily occur during routine operation of the facility being managed;
wherein said inventory tracking means further comprises a camera in communication with said computer, said camera being located to provide images of entry and egress of vehicles at a portal of the facility;
providing an inventory tracking means in communication with said database, for supplying event information to said database; and
providing an alert means in communication with said database, using said event information; and using said computer to process the event information supplied to said database to compile an event library;
and further comprising the step of using said computer and said event library to generate alerts to warn management of abnormal events upon occurrence of said predetermined conditions stored in said database.

8. A method as claimed in claim 7, further comprising the step of using said computer and said event library to compile reports.

9. A method as claimed in claim 7, further comprising the step of using said computer and said event library to control access to and egress from the facility.

10. A method for managing a facility which has controlled access for vehicles, comprising the steps of:
providing a computer;
providing a database in communication with said computer;
providing abnormal event information to said database which represents predetermined conditions which do not ordinarily occur during routine operation of the facility being managed;

providing a task tracking means in communication with said database;

providing an access management means in communication with said database, for supplying event information to said database;

providing an inventory tracking means in communication with said database, for supplying event information to said database; and wherein said inventory tracking means further comprises a camera in communication with said computer, said camera being located to provide images of entry and egress of vehicles at a portal of the facility;

providing a revenue control module having a programming log control (PLC) which logs and timestamps all signals, and which also activates corresponding outputs to mirror the input signals; and using said computer and event library to process the event information supplied to said database to compile an event library and to generate alerts to warn management of abnormal events upon occurrence of said predetermined conditions stored in said database.

11. A method as claimed in claim 10, wherein the revenue control module includes an A-loop and a B-loop for monitoring and reporting traffic, vehicle barriers for the A-loop and B-loop, ticket spit counts and ticket pay counts for generating revenue records, reconciling revenue data, and generating alerts when anomalies exceed a predetermined threshold.

12. A method as claimed in claim 1, wherein the task tracking means further comprises GPS tracking for tracking locations of employees.

* * * * *